United States Patent [19]
Monford

[11] Patent Number: 4,890,918
[45] Date of Patent: Jan. 2, 1990

[54] DOCKING ALIGNMENT SYSTEM

[75] Inventor: Leo G. Monford, Dickinson, Tex.

[73] Assignee: The United States of America as represented by the Administrator of the National Aeronautics and Space Administration, Washington, D.C.

[21] Appl. No.: 246,595

[22] Filed: Sep. 15, 1988

[51] Int. Cl.$^4$ .............................................. G01B 11/00
[52] U.S. Cl. ................................... 356/150; 244/161; 356/153; 356/399
[58] Field of Search ............... 356/138, 150, 152, 153, 356/399; 244/161; 358/103

[56] References Cited

U.S. PATENT DOCUMENTS

| | | | |
|---|---|---|---|
| 2,701,501 | 2/1955 | Cuny | |
| 3,349,664 | 10/1967 | Kohlenberger | |
| 3,614,439 | 10/1971 | Beelik, Jr. et al. | 356/138 |
| 3,910,533 | 10/1975 | Cheatham et al. | 244/161 |
| 3,994,588 | 11/1976 | Marx | 356/152 |
| 4,177,964 | 12/1979 | Hujsak et al. | 244/161 |
| 4,349,837 | 9/1982 | Hinds | 358/93 |
| 4,395,005 | 7/1983 | Ganssle | 244/161 |
| 4,621,924 | 11/1986 | Williams | 356/153 |

*Primary Examiner*—F. L. Evans
*Attorney, Agent, or Firm*—Hardie R. Barr; John R. Manning; Edward K. Fein

[57] ABSTRACT

Improved techniques are provided for alignment of two objects. The present invention is particularly suited for three-dimensional translation and three-dimensional rotational alignment of objects in outer space. A camera 18 is fixedly mounted to one object, such as a remote manipulator arm 10 of the spacecraft, while the planar reflective surface 30 is fixed to the other object, such as a grapple fixture 20. A monitor 50 displays in real-time images from the camera, such that the monitor displays both the reflected image of the camera and visible markings on the planar reflective surface when the objects are in proper alignment. The monitor may thus be viewed by the operator and the arm 10 manipulated so that the reflective surface is perpendicular to the optical axis of the camera, the roll of the reflective surface is at a selected angle with respect to the camera, and the camera is spaced a pre-selected distance from the reflective surface.

20 Claims, 1 Drawing Sheet

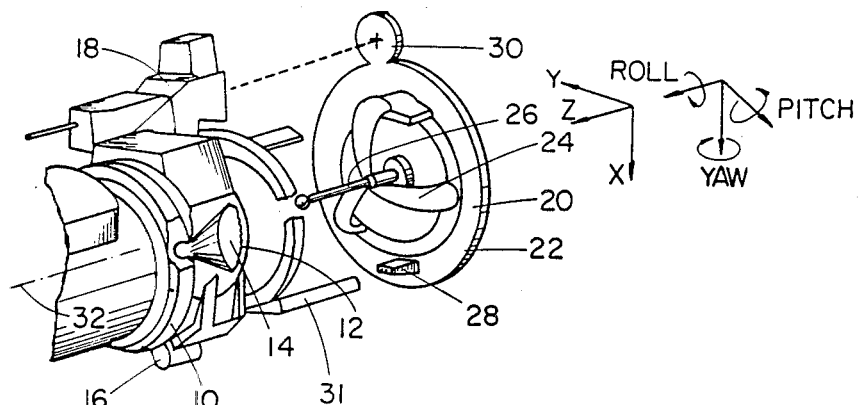
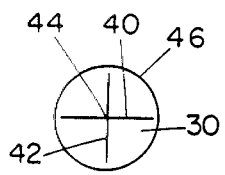
FIG. 2
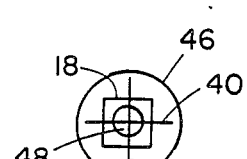
FIG. 3
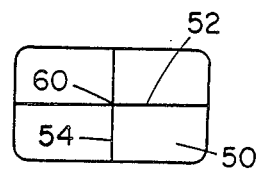
FIG. 4
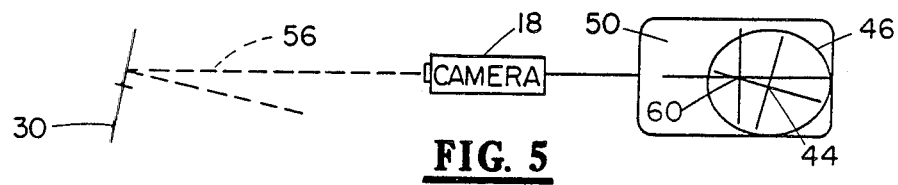
FIG. 5
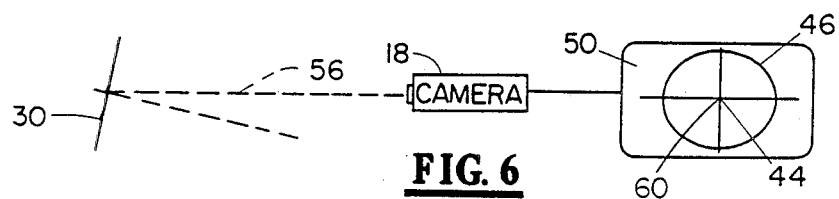
FIG. 6
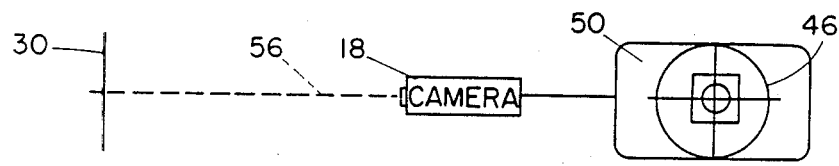
FIG. 7

DOCKING ALIGNMENT SYSTEM

ORIGIN OF THE INVENTION

The invention described herein was made by an employee of the United States Government and may be manufactured and used by or for the Government of the United States of America for governmental purposes without the payment of any royalties thereon or therefor.

TECHNICAL FIELD

The invention relates to methods and apparatus for aligning objects and, more particularly, relates to three-dimensional translation and three-dimensional rotation alignment techniques for real-time docking of objects in space.

BACKGROUND ART

Various techniques have been devised to align objects in proper two-dimensional relationship. For example, U.S. Pat. No. 2,701,501 discloses techniques for testing the axial alignment of an object with respect to an optical reference axis which is coincident with the geometrical axis of the supporting structure. U.S. Pat. No. 3,349,664 discloses techniques useful for properly aligning objects to check the pointing and mounting mechanism of a telescope. Two-dimensional alignment of the telescope with respect to a mirror is checked by verifying that the optical axis of the telescope is perpendicular to the mirror, so that light rays reflected off the mirror converge at the focal point and are sensed by a photo tube. U.S. Pat. No. 3,994,588 discloses techniques useful for torque measuring instruments to detect angular deflections of one object with respect to another. The uniform distribution of light reflected by a mirror back to photo detectors indicates a null position when the mirror is perpendicular to the optical axis of a light-emitting diode.

The proper alignment of objects is particularly critical in outer space applications. One object, such as a spacecraft manipulator arm, must be properly aligned for docking with another object to accomplish basic space operations. U.S. Pat. No. 3,910,533 teaches a docking alignment device suitable for aligning two spacecraft. A TV camera is mounted on one craft for viewing a three-dimensional target on the other craft. An image of the target is thus displayed on a TV monitor, so that three-dimensional traverse alignment of one craft relative to the other is possible. U.S. Pat. No. 4,349,837 discloses a similar system for alignment and docking of two objects in space, with a monitor displaying images from a TV fixed on one object and the monitor having markings for visual alignment with a target on the other object to be docked. The target may be proportioned with respect to the markings on the monitor so that the size of the target image and the two-dimensional alignment of the markings on the monitor and the target allow for three-dimensional traverse alignment of the objects. U.S. Pat. No. 4,395,005 teaches the use of fiber optic cables for aligning spacecraft, wherein one of the cables conveys light from a source to a docking location, and a second cable conveys an image of the docking location to a TV camera. U.S. Pat. Nos. 4,177,964 and 4,621,924 generally disclose optical alignment systems suitable for outer space applications.

The prior art does not, however, teach a system to easily and accurately align two objects in space which encompasses both three-dimensional translational and three-dimensional rotational alignment of the objects. Three-dimensional translational alignment of the objects is particularly critical when multiple objects are stored one on top of the other, which must subsequently be selectively picked up by a computerized or manually operated manipulator system. Also, preferred docking techniques preferably allow for independent three-dimensional translational alignment of two objects and three-dimensional rotational alignment of the objects. Moreover, proper alignment is preferably accomplished by a technique which is easily automated and provides high alignment accuracy.

The disadvantages of the prior art are overcome by the present invention, and a relatively simple yet reliable technique is hereinafter disclosed for properly aligning objects. The technique of the present invention is particularly well suited for aligning objects in outer space where proper three-dimensional translational and three-dimensional rotational alignment of the objects is necessary.

STATEMENT OF THE INVENTION

Improved methods and apparatus are provided for precise alignment of one object with respect to another. The present invention enables three-dimensional translational and three-dimensional rotational alignment of the objects. The image seen by a camera mounted to one object is displayed on a screen or monitor, and the other object is provided with a reflective surface positioned generally along the optical axis of the camera. Both the reflective surface and the screen may be provided with cross hairs which are aligned on the screen when the objects are in proper alignment. The techniques of the present invention utilize a camera're-flected image of itself, the pattern on the reflective surface, and the pattern on the monitor to ensure real-time translational and rotational alignment. An illuminated pattern on the camera facilitates locating the camera in the target mirror, and provides a convenient technique for determining the range between the camera and the mirror.

The techniques of the present invention are particularly well suited for alignment and docking of objects in outer space. A TV camera may be mounted to a spacecraft manipulator arm, and a reflective surface mounted on the object to be docked to the spacecraft. The docking operator thus observes the TV monitor to direct alignment and docking maneuvers. In order for the camera to see its image in the mirror, the optical axis of the camera must be perpendicular to the mirror. When the optical axis of the camera is aligned with the designated centerpoint of the mirror, two dimensional translational alignment is achieved. Rotational alignment in the third dimension may be provided by employing a cross hair pattern on the mirror, which is aligned with the cross hair pattern on the monitor to assure proper alignment during docking. The spacing between the camera and the mirror is proportional to the size of the reflected image of the camera on the monitor, so that proportional sizing of the camera on the monitor provides an indication of the range between the camera and the target mirror to achieve alignment in the third translational dimension. The method and apparatus of the present invention allows the decoupling of the rotational alignment maneuvers from the translational alignment maneuvers, but also allow both translational and rotational maneuvers to occur simultaneously.

Accordingly, it is an object of the present invention to provide improved methods and apparatus for aligning objects, utilizing a TV camera mounted to one object and a reflective surface generally positioned along the optical axis of the camera mounted to the other object. The TV monitor includes cross hairs which define a centerpoint representative of the intersection of the camera optical axis with the view seen by the camera. One object may thus be maneuvered with respect to the other object until the cross hairs on the reflective surface overlap the cross hairs on the monitor.

The present invention is well suited for use in aligning objects in outer space, and has the capability of ensuring three-dimensional translational and three-dimensional real-time rotational alignment of the objects for conducting docking maneuvers. The present invention may be utilized for aligning, docking and storing of multiple objects one on top of the other.

An advantage of the present invention is that the camera may be mounted in the center of an end effector attached to a shuttle remote manipulator arm. The technique of the present invention may also be easily automated by computer programming to provide high alignment accuracy. The geometry of the reflective surface may be selected to increase axial alignment of the objects in a particular translational direction or rotational angle.

These and further objects, features and advantages of the present invention will become apparent from the following detailed description, wherein reference is made to the figures in the accompanying drawings.

BRIEF DESCRIPTION OF THE DRAWINGS

FIG. 1 is a pictorial view, partially in cross section, illustrating an end of a shuttle remote manipulator arm of a spacecraft aligned with a grapple shaft of a fixture for docking. A camera is mounted to the manipulator arm, and a reflective surface is mounted to the grapple fixture generally along the optical axis of the camera.

FIG. 2 is a front view of the pattern on the reflective surface shown in FIG. 1.

FIG. 3 is a front view of the image seen by the camera in FIG. 1 during proper alignment of the manipulator arm and the grapple fixture.

FIG. 4 is a front view of a TV monitor for displaying images from the camera.

FIG. 5 is a simplified pictorial representation of a reflective surface which is neither centered nor perpendicular to the optical axis of the camera, and the resulting display on a monitor.

FIG. 6 is a simplified pictorial representation of a reflective surface which is centered but not perpendicular to the optical axis of the camera, and the resulting display on the monitor.

FIG. 7 is a simplified pictorial representation of a reflective surface which is aligned with and perpendicular to the optical axis of the camera, and the resulting display on the monitor.

DETAILED DESCRIPTION OF THE INVENTION

Although the present invention may be used for alignment of various objects, the techniques herein disclosed are well suited and are herein described with respect to aligning objects in outer space. One of the objects thus may be the mechanical arm of a payload deployment and retrieval system of a spacecraft, which may maneuver a payload (the second object) from the payload bay of the spacecraft to its deployment position and then release it. Also, concepts of the present invention enable the mechanical arm of the payload deployment and retrieval system to subsequently align itself with the payload or other object, grapple a free-flying object, maneuver it to the payload bay, and berth the object.

Referring now to FIG. 1, the end portion of a standard manipulator arm 10 of a payload deployment and retrieval system is shown generally aligned with a grapple fixture 20 (the payload). The arm 10 comprises a generally sleeve-like body 12 defining a cylindrical-shaped interior cavity 14, and has an optional electrical connector 16. Camera 18 is fixedly mounted to the arm 10 for manipulating alignment between the arm and the grapple fixture, as explained subsequently.

The grapple fixture 20 comprises a base plate 22, a plurality of guide ramp assemblies 24, and a grapple shaft 26. Electrical connection 28 may be provided for mating engagement with the connection 16 on the arm. A mirror or other flat reflective surface 30 is fixed to the grapple fixture at a position generally aligned with the optical axis of the camera. A plurality of standard end effectors 31 may be mounted to the arm 10 for grappling the payload 20, maintaining the payload rigidly attached to the arm, and for releasing the payload from the arm. If desired, special-purpose end effectors may be used for receiving electrical power.

Those skilled in the art will appreciate that the techniques of the present invention may be used for aligning the arm 10 with respect to the grapple fixture 20. The arm 10 may include a generally conical interior wall to guide the shaft 26 of the grapple fixture toward the centerline 32 of the arm. Various techniques may be used for grappling the arm 10 and the fixture 20, however, and such techniques are well known in the art and within the scope of this invention.

The primary components of the present invention comprise a television camera 18 fixedly mounted to the first object, which may either be an arm 10 or an end effector 31 as shown in FIG. 1. The camera 18 may be a conventional television camera with variable magnification capability for ensuring that the image seen by the camera remains in focus. In any event, the optical axis of the camera 18 is fixed with respect to the first object so that either translational or rotational movement of the first object will necessarily cause corresponding movement of the optical axis of the camera. It may be desirable in some applications to mount the camera 18 to an end effector, thereby reducing the distance between the camera and the reflective surface. Also, it is generally preferred that the optical axis of the camera be coaxial with the central axis of the object to which the camera is mounted to facilitate maneuvering operations, although this is often not practical. If the optical axis is spaced from the axis of the arm, as shown in FIG. 1, the operator or a computer program will consider and compensate for this spacing while performing maneuvering operations. In either event, the optical axis of the camera is parallel to the central axis 32 of the arm on which the camera is mounted.

The flat reflective surface or mirror 30 is attached to the second object, in this case the assembly 20, to be grappled by the end effectors and the arm. The mirror may be provided with a set of cross hairs to define the center of the mirror, as explained subsequently. A TV monitor may be provided at any convenient location in the spacecraft to be viewed by the astronaut. The monitor displays images from the camera 18 in real-time, and includes cross hairs precisely located at a point which represents the optical axis of the camera.

FIG. 2 is a front view of the mirror 30 generally shown in FIG. 1. A pair of perpendicularly arranged indicator lines or cross hairs 40 and 42 define a centerpoint 44 for the mirror. Cross hairs may be formed in conventional fashion either by coating the surface of the mirror or abrading the reflective surface from the mirror to form a visibly marked pattern on the mirror. A two-dimensional image 46 may also be provided on the mirror of a predetermined size and configuration, which as shown in FIG. 2 is a circle which encompasses the centerpoint 44 of the mirror 30. The image 46 may either be formed directly on the mirror in a manner similar to the formation of cross hairs 40 and 42, or may be formed as the peripheral edge surface of the mirror.

Referring now to FIG. 3, a front view of the image seen by the camera is depicted when the arm 10 and the assembly 20 are aligned so that the optical axis of the camera is perpendicular to the mirror. At this stage, the camera 18 thus sees the mirror 30 with the cross hairs and two-dimensional image 46 previously discussed, and also "sees" itself. For explanation purposes, a front configuration of the camera may be rectangular, so that the camera sees the mirror 30 and general rectangular configuration of itself and its lens 48.

The image from the camera is displayed in real-time on a monitor which includes a conventional display screen 50. Display screen 50 may comprise a conventional television picture tube, thereby forming a visible display of the output of the camera for viewing by an astronaut or other operator of the spacecraft. The monitor includes perpendicularly positioned cross hairs 52 and 54 for alignment of the first and second objects. The intersection of the cross hairs 52, 54 defines a centerpoint 60 which corresponds optically to the optical axis 56 of the camera and thus the center of the image seen by the camera. An alignment image on the monitor other than cross hairs is clearly contemplated by and within the scope of the invention.

The method of the present invention will be understood from the following description. When the TV camera 18 is pointed at the mirror 30, but its optical axis is not perpendicular to the mirror and strikes a location other than the center of the mirror, the monitor 50 may display an image substantially as shown in FIG. 5. In other words, the camera cannot "see" itself since its optical axis 56 is not perpendicular to the mirror 30, but the camera may see the cross hairs 40, 42 and the two-dimensional configuration 46 on the mirror. The centerpoint 44 on the mirror will thus not be aligned with the centerpoint 60 formed by the cross hairs 52 and 54 on the monitor, the cross hairs will not be parallel, and the circular two-dimensional pattern 46 will appear slightly elliptical.

Accordingly, the operator may first manipulate the "yaw" and "pitch" of the manipulator arm until the camera sees its image as reflected by mirror 30. Since the camera sees itself, the optical axis of the camera is perpendicular to the mirror. The operator may then manipulate the arm in the x-y plane so that the optical axis 56 of the camera strikes the center 44 of the mirror, at which time the centerpoints 44 and 60 will be coincident on the monitor. The operator may then "roll" the arm 10 so that rotational alignment of the camera and mirror is proper, at which time the cross hairs 40 and 42 are each parallel with the cross hairs 52 and 54, respectively. Since the cross hairs are parallel and the centerpoints 44 and 60 are coincident, cross hair 40 on the mirror overlaps cross hair 52 on the monitor, and similarly cross hair 42 on the mirror overlaps cross hair 54 on the monitor. Only the final translational alignment of the objects in the z-dimension (as explained subsequently) is then required to complete the three-dimensional translational and three-dimensional rotational alignment of the objects.

It should be understood that the alignment sequence used to obtain the translational and rotational alignment according to the present invention is not critical. FIG. 6 thus displays an image indicating that the optical axis of the camera passes through the centerpoint 44 of the mirror, since the points 44 and 60 are coincident. Since the cross hairs 40 and 42 overlap the corresponding cross hairs 52 and 54, proper roll of the objects has also been obtained. The two-dimensional pattern 46 on the mirror will, however, remain slightly elliptical since the axis 56 is not perpendicular to the mirror 30, and thus the monitor will not display the image of the camera. In this case, the operator may continue to manipulate the TV camera by altering the "yaw" and "pitch" of the arm 10 until the optical axis 56 remains pointed at the center of the mirror, and the mirror is perpendicular to the optical axis of the camera. When this is achieved and appropriate readjustments made to reobtain other alignments altered by this action, the monitor will display the image as shown in FIG. 7, with the cross hairs aligned, and with the display also showing the configuration of the camera 18 including the lens 48. At this stage, two-dimensional (x, y) translational alignment of the objects have been obtained, and the objects are in their proper rotational alignment, i.e., the roll, yaw and pitch of the objects are in alignment.

In order to obtain the final translational alignment of the objects (the z-dimension as shown in FIG. 1), the arm 10 may be moved toward the assembly 20 until the size of the image on the monitor indicative of the two-dimensional configuration 46 on the mirror matches the pre-selected size on the monitor. In the case as shown in FIG. 7, this size is obtained when the diameter of the circle 46 corresponds to the precise height of the display on the monitor 50. Thus, if the monitor displayed the image as shown in FIG. 7 except that the pattern 46 were smaller in diameter than the full height of the monitor, the operator would move the camera (the arm) closer to the assembly 20, thereby enlarging the image 46 on the screen and obtaining proper translational alignment of the objects in the z-dimension. Thus, the dimensional or proportional markings on the mirror and the monitor may provide the indication of the range or z-dimension between the camera 18 and the target mirror 30.

The techniques of the present invention allow for alternate or simultaneous translation and rotation of the camera (or the reflective surface) until the image of the camera is viewed on the monitor and the mirror (target) is centered on the monitor screen. This feature is particularly significant if the maneuvering of the objects to obtain alignment is accomplished by a computer in response to signals from a solid state TV camera comprising an array with a fixed axis. It should be understood, of course, that translation or rotation of one object with respect to the other object to obtain alignment in one dimension may alter alignments in other dimensions, so that realignment of the objects in any one dimension may be required to obtain proper alignment in all six dimensions (3 rotational, 3 translational). For example, pitch or yaw maneuvering required so that the optical axis of the camera will be perpendicular with the mirror will likely necessitate realignment of the objects in the x and y translational directions.

It should be understood that four different conditions will simultaneously occur to achieve the three-dimensional rotational and three-dimensional translational alignment possible according to the present invention: (1) the camera optical axis will be perpendicular to the reflective surface, so tat the camera sees itself, (2) a preselected point on the reflective surface must be at its preselected location with respect to the optical axis of the camera (generally this will occur when the centerpoint 44 on the mirror coincides with the centerpoint 60 on the monitor, with centerpoint 60 representing the optical axis of the camera), (3) visible markings on the reflective surface are at their preselected rotational position with respect to the camera (generally this occurs when the cross hairs on the mirror are each parallel with the corresponding cross hairs on the monitor), and (4) the camera is at its desired distance from the reflective surface.

When the objects are properly aligned, the optical axis of the camera will be perpendicular to the planar reflective surface, and the fixed point on the monitor corresponding to the optical axis of the camera will be at a predetermined position with respect to the visible marking pattern on the mirror. The design of the present invention allows the proper positioning of multiple objects which must be stowed one on top of the other, and selectively picked up one at a time by the arm 10. The techniques of the present invention are easily automated by the computer program, and provide high alignment accuracy. The simplicity of the design according to the present invention produces significant savings in grapple time.

In order to monitor the range of the camera with respect to the reflective surface (to obtain z-dimensional alignment), the pattern on the reflective surface is not necessary. Instead, one may monitor the size of the image of the camera (or its lens) on the monitor as an indication of range. This technique may be preferred in many instances, since the light path for this proportional determination will have gone from the camera to the reflective surface and back to the camera. This "mechanical multiplier" effect should thus produce a more accurate range determination than the technique wherein the size of the pattern on the reflective surface provided the range indication.

It should also be understood that any type of light source or variation in the reflective surface of the mirror 30 could provide an indication of the centerpoint or other fixed point on the mirror. For example, a circular hole through the center of the mirror having a diameter corresponding to the diameter of the camera lens would provide the necessary variance to be viewed by the camera to locate the center of the mirror on the monitor, but would also enable the camera to see through the target to view an operation behind the mirror.

As previously noted, the reflective surface of the mirror must be perpendicular to the optical axis of the camera for the camera to see itself. Although the entire mirror may be planar, it is also within the concept of the present invention that the target object have a non-planar reflective surface. The reflective surface may, for example, have a cylindrical or parabolic configuration, or may be a combination of planar and non-planar surfaces. The utilization of a reflective surface of this type may substantially enhance the accuracy of the alignment technique in one or more dimensions, although at the sacrifice of alignment accuracy in another dimension. Since alignment in one translational or rotational dimension may be critical while alignment in another translational or rotational dimension is not critical or even necessary, a more precise practical alignment technique may be possible by using a non-planar reflective surface.

Various other modifications will be suggested by the foregoing description. The cross hairs on the mirror and the monitor can be automatically aligned using analog or digital pattern matching algorithms. Patterns other than cross hairs can be provided, or the cross hairs could be replaced with light-emitting diodes. Various techniques may also be used to determine the range or proper z-dimension between the two objects other than that discussed above. For example, a pair of light-emitting diodes may be provided on immediately opposite sides of the camera, and proportionally spaced "doughnuts" provided on the display screen of the monitor 50. The light-emitting diodes will thus facilitate "finding" the camera in the reflected image from the mirror, and the desired range between the camera and the target will occur when the display of the light-emitting diodes fits within the corresponding doughnut-shaped images on the monitor.

It should also be understood that the techniques of the present invention are applicable to alignment of various objects in terrestrial applications. In robotics, for example, it is often desired to align the arm of the robot with the object to be worked on or manipulated by the robot, and the present invention can easily satisfy this objective. A computer may be tied to the output of the camera for automatically maneuvering the robot arm to align the objects in the manner previously described. Although a visual output of the alignment operation may be desired, the comparison of the desired image to the actual image need not be graphic, and thus may be accomplished by computer.

Whether used in terrestrial or outer space operations, more than one camera may be mounted on the manipulating arm, with the optical axis of each camera intended to be generally in line with and perpendicular to an appropriately positioned reflective surface. Two cameras may thus have their optical axes rotated 90° apart, with one camera facing forward while the other camera looked to the side. This technique would, of course, significantly increase the accuracy of the alignment process since neither camera need be relied upon to produce a range indication of the spacing between the two objects. As a further example of a terrestrial application, the techniques of the present invention would also be applicable to assisting a fork lift operator in properly positioning forks of the vehicle with respect to rows and columns of stacked pallets.

Although the invention has been described in terms of the specific embodiments which are set forth in detail, it should be understood that this is by illustration only. This invention is, accordingly, not necessarily limited thereto, since alternative embodiments and operating techniques can become apparent to those skilled in the art in view of the disclosure. Accordingly, modifications are contemplated which can be made without departing from the spirit of the described invention.

What is claimed is:

1. Apparatus for real-time alignment of a first object with respect to a second object, the apparatus comprising:
    camera means mounted to the first object and having an optical axis fixed with respect to the first object;
    a reflective surface fixedly mounted to the second object and having a visible pattern thereon; and
    monitor means for displaying in real-time images from the camera means and having a point optically fixed with respect to the optical axis of the camera means, such that the monitor means displays both the reflected image of the camera means and the visible pattern on the reflective surface each in relation to the fixed point on the monitor means when the reflective surface is perpendicular to the optical axis of the camera means.

2. The apparatus as defined in claim 1, wherein the monitor means displays an alignment image fixed with respect to the optical axis of the camera means, and the image of the visible pattern on the reflective surface is aligned on the monitor means with the alignment image when the first object is rotationally rolled into alignment with the second object.

3. The apparatus as defined in claim 1, wherein the reflective surface is a planar surface.

4. The apparatus as defined in claim 2, wherein the visible pattern on the reflective surface is of a preselected size, and a proportional size of the image of the visible pattern on the monitor means corresponds to a distance the camera means is spaced from the reflective surface.

5. The apparatus as defined in claim 4, wherein the preselectively sized visible pattern on the reflective surface comprises:
    cross hairs defining a centerpoint for the reflective surface; and
    a two-dimensional image of a predetermined size.

6. The apparatus as defined in claim 5, wherein the two-dimensional image encompasses the centerpoint of the reflective surface.

7. The apparatus as defined in claim 5, wherein the display of the two-dimensional image on the monitor means is of a preselected size when the camera means is spaced a preselected distance from the reflective surface.

8. The apparatus as defined in claim 1, wherein the fixed point on the monitor means is a cross hair point corresponding optically to the optical axis of the camera means.

9. Alignment apparatus for alignment and docking of a first object in outer space with respect to a second object in outer space, one of the first or second objects including power means for translational and rotational movement of the powered object with respect to the other object, the alignment apparatus comprising:
    camera means mounted to the first object and having an optical axis fixed with respect to the first object;
    a reflective surface fixedly mounted to the second object and having a visible pattern thereon; and
    monitor means for displaying images from the camera means and having a fixed point corresponding optically to the optical axis of the camera means, such that the monitor means displays both the reflected image of the camera means and the visible pattern on the reflective surface each in a pre-selected relationship to the fixed point on the monitor means when (a) the reflective surface is prependicular to the optical axis of the camera means, and (b) the first object is at a selected rotational roll with respect to the second object.

10. The alignment apparatus as defined in claim 9, wherein the reflective surface is a planar surface.

11. The alignment apparatus as defined in claim 9, wherein the monitor means displays images from the camera means in real-time.

12. The alignment apparatus as defined in claim 9, wherein the visible pattern on the reflective surface is of a pre-selected size, and a proportional size of the image of the visible pattern on the monitor means corresponds to a distance the camera means is spaced from the reflective surface.

13. The alignment apparatus as defined in claim 12, wherein the preselectively sized visible marking pattern on the reflective surface comprises:
    cross hairs defining a centerpoint for the reflective surface; and
    a two-dimensional image of a predetermined size.

14. The alignment apparatus a defined in claim 13, wherein the two-dimensional image encompasses the centerpoint of the reflective surface.

15. The alignment apparatus as defined in claim 13, wherein the display of the two-dimensional image on the monitor means is of a preselected size when the camera means is spaced a preselected distance from the reflective surface.

16. The alignment apparatus as defined in claim 12, wherein the fixed point on the monitor means is a cross hair point formed by the intersection of non-parallel lines.

17. A method for aligning in real-time a first object with respect to a second object, the method comprising:
    mounting a camera to the first object having an optical axis fixed with respect to the first object;
    mounting a reflective surface to the second object having a visible pattern thereon;
    displaying in real-time images from the camera on a monitor having a fixed point corresponding optically to the optical axis of the camera; and
    maneuvering the first object with respect to the second object in response to the display on the monitor until the monitor displays both the reflected image of the camera and the visible pattern each in a preselected relationship with respect to the fixed point on the monitor indicative of the reflective surface being perpendicular to the optical axis of the camera.

18. The method as defined in claim 17, further comprising:
    providing an alignment image on the monitor fixed with respect to the optical axis of the camera; and
    rotating the first object with respect to the second object until the image of the visible pattern on the reflective surface is aligned on the monitor with the alignment image.

19. The method as defined in claim 17, wherein the step of maneuvering the first object with respect to the second object comprises:
    moving the first object to alter the spacing between the camera and the reflective surface until the size of the reflected image of the camera on the monitor corresponds to a predetermined distance between the camera and the reflective surface.

20. The method as defined in claim 18, wherein the reflective surface is a planar surface having a pattern of a pre-selected size, and the step of maneuvering the first object with respect to the second object comprises:
    moving the first object to alter the spacing between the camera and the reflective surface until the image of the pattern on the monitor corresponds to a predetermined distance between the camera and the reflective surface.

* * * * *